United States Patent Office

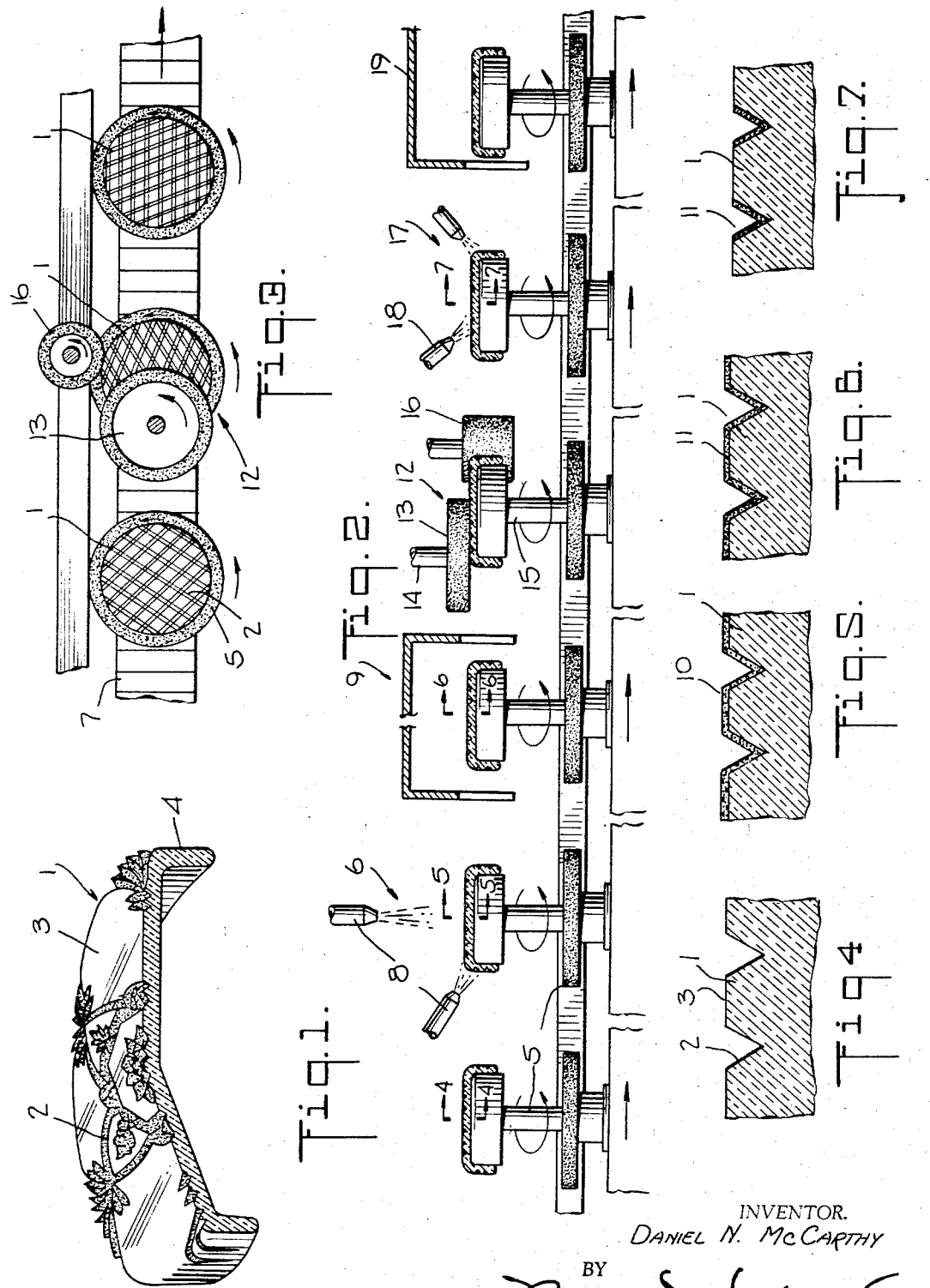

3,346,410
Patented Oct. 10, 1967

3,346,410
COLOR ORNAMENTATION OF GLASS ARTICLES
Daniel N. McCarthy, Lancaster, Ohio, assignor to Anchor Hocking Glass Corporation, Lancaster, Ohio, a corporation of Delaware
Filed Dec. 2, 1963, Ser. No. 327,329
2 Claims. (Cl. 117—8)

The present invention relates to the decoration of glassware and to an improved decorated glassware product and more particularly to a novel method for forming a colored decoration on glassware of the cut style and to a novel decorated product resulting from the method.

The present invention provides a novel combination of cut glass decoration or a similar physical decoration of glassware with fired-on coloring of the glass. A unique and attractive combined decorative result is obtained giving a new, attractive, and relatively easily made glass product.

The new decorative method as described below is readily adapted for incorporation in an otherwise regular glass coloring operation. The new result is obtained with the addition of several novel steps performed as indicated in the description of the preferred embodiment by relatively simple cooperating apparatus.

Accordingly, an object of the invention is to provide a new method of decorating glassware and the new product thus manufactured.

Another object of the present invention is to provide a novel combination of glass cutting or cutting style decoration and coloring whereby a unique decoration is provided utilizing a combination of the decorative effects of both the physical design and the coloring.

Another object of the present invention is to provide a new method of coloring or decorating glassware.

Another object of the present invention is to provide a novel decorative glass article.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen of purposes of illustration and description and is shown in the accompanying drawings, forming a part of the specification, wherein:

FIG. 1 is a perspective view partially cutaway of a glass article decorated in accordance with the present invention;

FIG. 2 is a diagrammatic illustration of a preferred embodiment of the method in accordance with the present invention;

FIG. 3 is a diagrammatic plan view of the buffing step of the method; and

FIGS. 4–7 are enlarged fragmentary sectional views of the ware being decorated taken along lines 4—4, 5—5, 6—6, and 7—7 of FIG. 2 respectively.

The following description of a preferred embodiment will be made in connection with the decoration of an article of glassware such as a glass dish decorated by an appropriate design cut or mold on its outer surface in accordance with the known cutting methods where the decorative pattern has been incised or cut or molded or pressed into the glass surface. The decorative method is particularly effective when used with a conventional cut design in the manner generally known in the trade as cut glass or cut-style glass where relatively deep depressions of about one-eigth of an inch or more are provided as decorative design. An article such as the dish 1 (FIG. 1) is first formed with the decorative incisions 2 molded or cut into the surface. The dish 1, shown inverted, has the cuts 2 formed in its outer bottom 3 and side walls 4.

This article is now placed on a suitable spindle 5 (FIG. 2) or otherwise handled for the application of fired-on glass decorating colors. Such colors may be any of the commercially obtained and regularly used decorating colors a common type of which are essentially low melting borosilicate glasses pigmented with inorganic oxides. Such decorating colors are most conveniently sprayed directly onto the article surface and for this purpose they may be conveniently used in liquid form as an aqueous mixture with the pigmented glasses suspended in a mixture such as three-parts water and one-part of ethyl alcohol. Such mixtures ready for application are commercially obtained as well as other generally similar decorating colors suitable for spraying and having various aqueous mixtures with alcohol, turpentine, or other mineral spirits.

The coloring is now sprayed over the entire surface containing the decorating cuts or grooves. This may be conveniently done in a continuous process as illustrated in FIG. 2 where the dishes 1 are carried through the spraying station 6 on a spindle 5 supported by a suitable conveyor or moving table 7. Preferably the dish 1 is rotated during the application of the color by conveniently positioned spray nozzles 8 to assure the uniform application of the coloring to the surface to be decorated. In the illustrated embodiment this is the bottom 3 and side walls 4 of the glass dish 1. The coating of color is next dried. The process may be accelerated by exposing the colored surface briefly to an elevated temperature such as about 200° F. to 300° F. This leaves a dry powdery coating of the coloring material lightly adhered to the surface of the article. FIG. 2 illustrates the color sprayed dishes 1 being passed through a suitable hot air or other drier 9. The enlarged detailed sectional views in FIGS. 5 and 6 show the color film 10 as first applied and after drying as the adhering powder 11.

The dried coloring 11 is now further processed to restrict it to a coating of the grooved or cut areas 2 of the coated surface whereby the novel decoration effect is subsequently obtained after the firing of the coloring material. This restriction of the coloring to the groove or cut surfaces 2 is obtained in the preferred embodiment by polishing or buffing the coated surfaces of the dish 1 whereby the portion of the coloring matter applied to the flat surfaces is buffed or polished off.

In the preferred embodiment of the method as illustrated diagrammatically in FIG. 2, this color removing operation preferably comprises a buffing of the article surfaces at a buffing station by a rotating buffing wheel 13 with the axis 14 of the wheel 13 offset from the axis 15 of the rotating dish 1. The article contacting surface of the buffing wheel 13 is arranged to have a complete coverage of the colored surface.

Where the decorated surface is in more than one plane as is the case with the decorated dish 1 illustrated, an additional brush 16 is appropriately positioned to remove the surface coloring from these additional areas.

The coloring which has been removed from the outer surfaces is now cleared off from the article at a cleaning station 17 by air jets 18 or light brushing. The article now has the coloring material confined to the grooves or cuts 2 as illustrated in the enlarged sectional view of FIG. 7.

The decorated articles are now passed through a conventional decorating lehr 19 where the decorated dishes 1 are brought up to an elevated temperature to cause the firing of the decorating material and the welding of the melted decorating material to the heated surface of the glass article. With a typical clear glass coloring mixture, the lehr atmosphere may have a temperature of about 1380° F. to cause the surface of the decorated article to reach a temperature of about 1050° F. as the coloring powder softens and fuses to the article surface at about 1350° F. The lehr temperature and exposure times are adjusted depending upon the particular coloring being used in accordance with the regular techniques used in the application of fired-on colors.

In the decorating lehr 19 it is preferable to pass the articles 1 through a pre-heated zone for raising the temperature of the coloring material slowly to insure that all organic compounds are completely expelled from the coloring matter thereby preventing blistering in the final firing zone.

After the firing of the colors a regular annealing operation may be performed in accordance with the particular article and glass being handled.

The resulting article has a combined cut and colored decoration effect resulting from the combination of these decorative means. The applied colors themselves are confined to the cut or recessed portions. This applied color which is confined to the recessed portions, however, will be reflected and transmitted through the remaining transparent portions of the article such as the dish 1 to provide a novel softened overall coloring effect. A particularly pleasing effect is obtained where the article is a container such as illustrated by the dish and where it is normally viewed from above with the recessed and colored portions resting on the table or other supporting surface and with the smooth inside of the article exposed to the viewer's eye.

Since the coloring is limited to the recessed portions, it will normally be remote from the surfaces of the glass articles engaged in normal use and will thus not be exposed to excess wear. The fired colors may be chosen to be wear resistant as well as detergent resistant. The above described novel coloring effect will thus be substantially indestructible so that in normal usage it will last as long as the decorated article.

It will be seen that a novel decorating method has been provided for glass articles which combines the effects of cut decorations with fired-on colored decorations. The method is relatively simple and may be added to present decorating or annealing apparatus to produce the decorated articles at high speeds with automatically performed decorating steps. The finished decorations not only provide novel and pleasing decorative effects, but are also permanently applied so that the decorated articles may be used in the normal ways of glassware and tableware and will not be impaired by such use and may be conveniently cleaned by normal washing or polishing.

As various changes may be made in the method and the decorated article without departing from the spirit and scope of the invention and without sacrificing any of its advantages, it is to be understood that all matter herein is to be interpreted as illustrative and not in a limiting sense.

Having thus described my invention, I claim:

1. The method of ornamentally coloring a transparent glass receptacle having outer and under surfaces and relatively smooth normally viewed inner and upper surfaces which comprises the steps of forming in said outer and under surfaces relatively deep recesses having angularly intersecting side walls, spraying translucent colored glass particles in an evaporatable liquid vehicle as a relatively thin coating of uniform thinness over the said outer and under surfaces, heating and drying the coating to remove the vehicle, rubbing the outermost portions of the said outer and under surfaces to remove the dried coating therefrom while leaving said coating applied as a uniformly thin film adhering to the walls of said recesses only, and fusing the colored glass particles in said film to each other and to the walls of the recesses so as to form a uniformly thin translucent colored coating conforming to the angularly formed walls of the recesses.

2. An ornamentally colored transparent glass receptacle comprising the combination of outer and under surfaces and normally viewed smooth inner and upper surfaces, relatively deep recesses in said outer and under surfaces having inwardly intersecting side walls, and a thin film of fused translucent coloring of uniform thinness on said walls of the recesses only, with the outer surfaces of the coloring film intersecting and being respectively generally parallel to said walls.

References Cited

UNITED STATES PATENTS

| | | | |
|---|---|---|---|
| 1,494,630 | 5/1924 | Reizenstein | 117—8 |
| 2,374,356 | 4/1945 | Keuffel et al. | 117—10 |
| 3,244,556 | 4/1966 | Mytych | 117—64 |
| 3,265,520 | 8/1966 | Obenshain | 117—8 |

ALFRED L. LEAVITT, *Primary Examiner.*

A. H. ROSENSTEIN, *Assistant Examiner.*